United States Patent Office.

CATHARINE BRUNER, OF MARSHALL, MISSOURI.

Letters Patent No. 97,349, dated November 30, 1869.

IMPROVEMENT IN PRESERVING EGGS AND OTHER ARTICLES.

The Schedule referred to in these Letters Patent and making part of the same.

*To all whom it may concern:*

Be it known that I, CATHARINE BRUNER, of Marshall, in the county of Saline, and State of Missouri, have invented a new and useful Improvement in Preserving Eggs and other Articles; and I do hereby declare that the following is a full, clear, and exact description thereof, which will enable others skilled in the art to make and use the same.

This invention relates to a new and useful invention and discovery, whereby eggs may be kept perfectly good and sound for an indefinite period of time, and consists in the use of a compound, composed of the ingredients hereinafter named, and used in the manner stated.

In carrying out my invention and discovery, I form a compound, as follows:

To one pound of tallow, I add one ounce of beeswax and one ounce of rosin.

These ingredients are melted together, and while the composition is in a fluid state, the eggs are covered therewith, thus entirely excluding the oxygen of the air and preventing evaporation.

This coating on the shell is sufficient to preserve the egg perfectly sound and sweet for months, where the temperature is not below the freezing-point. In cold and freezing weather, the eggs require further protection, and for affording such protection, I pack the eggs in flax-seed.

In experimenting with various seeds, as well as with other substances, I have discovered flax-seed to be superior to any other seed or substance for keeping out frost.

I pack the eggs in barrels or boxes, in layers, each layer surrounded by the seed, with a suitable covering on the top. Not only eggs, but fruit (in cans or otherwise) and other articles may be preserved from frost by the use of flax-seed, substantially in the manner described.

Having thus described my invention,

I claim as new, and desire to secure by Letters Patent—

For preserving eggs, when prepared as above described, and preserving other articles from frost in freezing weather, the use of flax-seed, substantially as described.

CATHARINE BRUNER.

Witnesses:
 DARE DAY,
 JOHN S. BRUNER.